United States Patent
Stucky et al.

(10) Patent No.: US 6,344,268 B1
(45) Date of Patent: Feb. 5, 2002

(54) FOAMED POLYMER-FIBER COMPOSITE

(75) Inventors: David J. Stucky, Brooklyn; Randall Elinski, Jackson, both of MI (US)

(73) Assignee: CertainTeed Corporation, Valley Forge, PA (US)

(*) Notice: Subject to any disclaimer, the term of this patent is extended or adjusted under 35 U.S.C. 154(b) by 0 days.

(21) Appl. No.: 09/055,098

(22) Filed: Apr. 3, 1998

(51) Int. Cl.[7] .................................................. B32B 5/22
(52) U.S. Cl. ........................ 428/317.9; 428/318.8; 521/145; 521/920; 524/35
(58) Field of Search ................ 428/317.9, 318.8; 521/145, 920; 524/35

(56) References Cited

U.S. PATENT DOCUMENTS

| | | | |
|---|---|---|---|
| 2,188,396 A | 1/1940 | Semon | 18/55 |
| 2,489,373 A | 11/1949 | Gilman | 260/37 |

(List continued on next page.)

FOREIGN PATENT DOCUMENTS

| | | |
|---|---|---|
| DE | 2 042 176 | 4/1971 |
| DE | 23 44 101 | 3/1975 |
| DE | 1 443 194 | 7/1976 |
| DE | 3 801 574 | 8/1989 |
| DE | 43 07 323 | 4/1994 |
| EP | 0 586 211 | 3/1994 |
| EP | 0 586 212 | 3/1994 |
| EP | 0 586 213 | 3/1994 |
| FR | 2 270 311 | 12/1975 |
| FR | 2 365 017 | 4/1978 |
| FR | 2 365 019 | 4/1978 |
| FR | 2 445 885 | 8/1980 |
| FR | 2 564 374 | 11/1985 |
| GB | 2 036 148 | 6/1980 |
| GB | 2 104 903 | 3/1983 |
| GB | 2 171 953 | 9/1986 |
| GB | 2 186 655 | 8/1997 |
| JP | 58-179242 | 10/1983 |
| JP | 60-82319 | 5/1985 |
| JP | 63-139946 | 6/1988 |
| JP | 2-32805 | 2/1990 |
| WO | WO 90/08020 | 7/1990 |

OTHER PUBLICATIONS

Cellular and Microcellular Materials, Matuana et al., "Effects of Morphology on the Properties of Microcellular Foamed PVC/Wood–Fiber Composites", MD–vol. 76, ASME Dec. 1996.*

PARALOID® Additives for RVC From Rohm and Haas (Product Update), Rohm and Haas Company, Dec. 1995.*

Laurent Matuana–Malanda, Chul B. Park and John J. Balatinecz, Production of Microcellular Foamed PVC/Wood–Fibre Composites: Processing and Cell Morphology Relationship, ANTEC 96, pp. 1900–1907, (no date).

L. Matuana–Malanda, C.B. Park and J.J. Balatinecz, Characterization of Microcellular Foamed PVC/Cellulosic–Fibre Composites, *Journal of Cellular Plastics*, vol. 32—Sep. 1996, pp. 449–469.

"Suppliers team to expand foam coex into sheet, profiles", from Technology News, Plastics World, Oct. 1996.

(List continued on next page.)

*Primary Examiner*—Blaine Copenheaver
*Assistant Examiner*—Leanna Roche'
(74) *Attorney, Agent, or Firm*—Oblon, Spivak, McClelland, Maier & Neustadt, P.C.

(57) ABSTRACT

Foamed polymer-fiber composites, building materials and methods of making such building materials are provided by this invention. The composites include about 35–75 wt. % of a polymeric resin, about 25–65 wt. % fiber and have a specific gravity of less than about 1.25 g/cc. The low density is provided by the introduction of a blowing agent or gas into a molten precursor of the composite during thermo forming, such as in an extrusion operation.

21 Claims, 3 Drawing Sheets

U.S. PATENT DOCUMENTS

| | | | |
|---|---|---|---|
| 2,519,442 A | 8/1950 | DeLorme et al. | 260/17.4 |
| 2,635,976 A | 4/1953 | Meiler et al. | 154/132 |
| 2,680,102 A | 6/1954 | Becher et al. | 260/17.3 |
| 2,789,903 A | 4/1957 | Lukman et al. | 92/21 |
| 2,926,729 A | 3/1960 | Zanini | 160/236 |
| 2,935,763 A | 5/1960 | Newman et al. | 18/55 |
| 3,147,518 A | 9/1964 | Horgan | 20/56 |
| 3,287,480 A | 11/1966 | Wechsler et al. | 264/122 |
| 3,308,218 A | 3/1967 | Wiegand et al. | 264/121 |
| 3,309,444 A | 3/1967 | Schueler | 264/109 |
| 3,349,538 A | 10/1967 | Crossman | 52/731 |
| 3,492,388 A | 1/1970 | Inglin-Knüsel | 264/129 |
| 3,493,527 A | 2/1970 | Schueler | 260/17.2 |
| 3,562,373 A | 2/1971 | Logrippo | 264/118 |
| 3,645,939 A | 2/1972 | Gaylord | 260/17.4 |
| 3,671,615 A | 6/1972 | Price | 264/39 |
| 3,764,642 A | 10/1973 | Boutillier | 264/47 |
| 3,844,084 A | 10/1974 | Hubbard et al. | 52/731 |
| 3,864,201 A | 2/1975 | Susuki et al. | 161/160 |
| 3,867,493 A | 2/1975 | Seki | 264/45.9 |
| 3,878,143 A | 4/1975 | Baumann et al. | 260/17.4 |
| 3,879,505 A | 4/1975 | Boutillier et al. | 264/48 |
| 3,888,810 A | 6/1975 | Shinomura | 260/17.4 |
| 3,899,559 A | 8/1975 | Johnanson et al. | 264/115 |
| 3,903,023 A | 9/1975 | Boutillier et al. | 260/2.5 |
| 3,904,726 A | 9/1975 | Jacquelin et al. | 264/117 |
| 3,922,328 A | 11/1975 | Johnson | 264/46.1 |
| 3,931,384 A | 1/1976 | Forquer et al. | 264/120 |
| 3,937,777 A | 2/1976 | Wienand et al. | 264/53 |
| 3,943,079 A | 3/1976 | Hamed | 260/17.4 |
| 3,954,555 A | 5/1976 | Kole | 162/136 |
| 3,956,541 A | 5/1976 | Pringle | 428/2 |
| 3,956,555 A | 5/1976 | McKean | 428/106 |
| 3,969,459 A | 7/1976 | Fremont et al. | 264/109 |
| 3,978,632 A | 9/1976 | Ansted | 52/309 |
| 3,983,295 A | 9/1976 | Murer et al. | 428/315 |
| 4,005,162 A | 1/1977 | Bucking | 264/25 |
| 4,012,348 A | 3/1977 | Chelland et al. | 260/28.5 |
| 4,016,232 A | 4/1977 | Pringle | 264/112 |
| 4,016,233 A | 4/1977 | Pringle | 264/122 |
| 4,018,722 A | 4/1977 | Baker | 260/2.3 |
| 4,028,449 A | 6/1977 | Kakitani et al. | 264/45.3 |
| 4,029,831 A | 6/1977 | Daunheimer | 427/264 |
| 4,031,045 A | 6/1977 | Goswami | 260/2.5 |
| 4,033,913 A | 7/1977 | Sundén | 260/17 |
| 4,045,603 A | 8/1977 | Smith | 428/2 |
| 4,056,591 A | 11/1977 | Goettler et al. | 264/108 |
| 4,058,580 A | 11/1977 | Flanders | 264/113 |
| 4,071,479 A | 1/1978 | Broyde et al. | 260/2.3 |
| 4,071,494 A | 1/1978 | Gaylord | 260/42.14 |
| 4,097,648 A | 6/1978 | Pringle | 428/326 |
| 4,102,106 A | 7/1978 | Golder et al. | 52/533 |
| 4,107,110 A | 8/1978 | Lachowicz et al. | 260/17.4 |
| 4,115,497 A | 9/1978 | Halmø et al. | 264/115 |
| 4,145,389 A | 3/1979 | Smith | 260/40.7 |
| 4,157,415 A | 6/1979 | Lindenberg | 428/284 |
| 4,168,251 A | 9/1979 | Schinzel et al. | 260/17.4 |
| 4,178,411 A | 12/1979 | Cole et al. | 428/310 |
| 4,181,764 A | 1/1980 | Totten | 428/155 |
| 4,187,352 A * | 2/1980 | Klobbie | 521/79 |
| 4,191,798 A | 3/1980 | Schumacher et al. | 428/95 |
| 4,203,876 A | 5/1980 | Dereppe et al. | 260/17.4 |
| 4,228,116 A | 10/1980 | Colombo et al. | 264/119 |
| 4,234,641 A | 11/1980 | Thompson et al. | 428/159 |
| 4,239,679 A | 12/1980 | Rolls et al. | 260/42.49 |
| 4,241,133 A | 12/1980 | Lund et al. | 428/326 |
| 4,244,903 A | 1/1981 | Schnause | 264/68 |
| 4,248,743 A | 2/1981 | Goettler | 260/17.4 |
| 4,248,820 A | 2/1981 | Haataja | 264/113 |
| 4,250,222 A | 2/1981 | Mavel et al. | 428/285 |
| 4,263,184 A | 4/1981 | Leo et al. | 260/17.4 |
| 4,263,196 A | 4/1981 | Schumacher et al. | 260/33.6 |
| 4,272,577 A | 6/1981 | Lyng | 428/112 |
| 4,273,688 A | 6/1981 | Porzel et al. | 260/17.4 |
| 4,277,428 A | 7/1981 | Luck et al. | 264/118 |
| 4,281,039 A | 7/1981 | Miura et al. | 428/159 |
| 4,290,988 A | 9/1981 | Nopper et al. | 264/112 |
| 4,303,019 A | 12/1981 | Haataja et al. | 108/51.1 |
| 4,305,901 A | 12/1981 | Prince et al. | 264/17.6 |
| 4,311,554 A | 1/1982 | Herr | 162/159 |
| 4,311,621 A | 1/1982 | Nishizawa et al. | 260/17.2 |
| 4,317,765 A | 3/1982 | Gaylord | 523/204 |
| 4,323,625 A | 4/1982 | Coran et al. | 428/361 |
| 4,328,136 A | 5/1982 | Blount | 523/204 |
| 4,376,144 A | 3/1983 | Goettler | 428/36 |
| 4,382,108 A | 5/1983 | Carroll et al. | 428/326 |
| 4,382,758 A | 5/1983 | Nopper et al. | 425/82.1 |
| 4,393,020 A | 7/1983 | Li et al. | 264/108 |
| 4,414,267 A | 11/1983 | Coran et al. | 428/288 |
| 4,420,351 A | 12/1983 | Lussi et al. | 156/62.4 |
| 4,426,470 A | 1/1984 | Wessling et al. | 524/35 |
| 4,430,468 A | 2/1984 | Schumacher | 524/109 |
| 4,440,708 A | 4/1984 | Haataja et al. | 264/109 |
| 4,454,091 A | 6/1984 | Chion et al. | 264/171 |
| 4,455,709 A | 6/1984 | Zanini | 16/90 |
| 4,473,665 A | 9/1984 | Martini-Vvedensky et al. | 521/79 |
| 4,480,061 A | 10/1984 | Coughlin et al. | 524/13 |
| 4,481,701 A | 11/1984 | Hewitt | 29/416 |
| 4,491,553 A | 1/1985 | Yamada et al. | 264/51 |
| 4,503,115 A | 3/1985 | Hemels et al. | 428/281 |
| 4,505,869 A | 3/1985 | Nishibori | 264/115 |
| 4,506,037 A | 3/1985 | Suzuki et al. | 521/82 |
| 4,508,595 A | 4/1985 | Gåsland | 162/158 |
| 4,510,201 A | 4/1985 | Takeuchi et al. | 428/285 |
| 4,551,294 A | 11/1985 | Wottka et al. | 264/175 |
| 4,562,218 A | 12/1985 | Fornadel et al. | 524/15 |
| 4,594,372 A | 6/1986 | Natov et al. | 523/208 |
| 4,597,928 A | 7/1986 | Terentiev et al. | 264/87 |
| 4,610,900 A | 9/1986 | Nishibori | 428/15 |
| 4,619,097 A | 10/1986 | Trummer et al. | 52/730 |
| 4,645,631 A | 2/1987 | Hegenstaller et al. | 264/69 |
| 4,652,218 A | 3/1987 | Tsutsui et al. | 417/368 |
| 4,659,754 A | 4/1987 | Edwards et al. | 523/214 |
| 4,663,225 A | 5/1987 | Farley et al. | 428/290 |
| 4,686,251 A | 8/1987 | Ostermann et al. | 523/448 |
| 4,687,793 A | 8/1987 | Motegi et al. | 523/200 |
| 4,716,062 A | 12/1987 | Klein | 428/36 |
| 4,717,742 A | 1/1988 | Beshay | 523/203 |
| 4,734,236 A | 3/1988 | Davis | 264/112 |
| 4,737,532 A | 4/1988 | Fujita et al. | 524/13 |
| 4,769,109 A | 9/1988 | Tellvik et al. | 162/123 |
| 4,769,274 A | 9/1988 | Tellvik et al. | 428/218 |
| 4,774,272 A | 9/1988 | Lamphere et al. | 524/13 |
| 4,783,493 A | 11/1988 | Motegi | 524/13 |
| 4,789,604 A | 12/1988 | van der Hoeven | 428/503 |
| 4,790,966 A | 12/1988 | Sandberg et al. | 264/39 |
| 4,791,020 A | 12/1988 | Kokta | 428/326 |
| 4,801,495 A | 1/1989 | van der Hoeven | 428/286 |
| 4,818,604 A | 4/1989 | Tock | 428/319.9 |
| 4,820,749 A | 4/1989 | Beshay | 523/203 |
| 4,820,763 A | 4/1989 | Yang | 524/505 |
| 4,851,458 A | 7/1989 | Hopperdietzel | 523/205 |
| 4,865,778 A | 9/1989 | Davis | 264/112 |
| 4,889,673 A | 12/1989 | Takimoto | 264/118 |
| 4,892,774 A | 1/1990 | Vallance | 428/174 |
| 4,894,192 A | 1/1990 | Warych | 264/68 |
| 4,915,764 A | 4/1990 | Miani | 156/244.19 |
| 4,927,572 A | 5/1990 | van der Hoeven | 264/22 |
| 4,927,579 A | 5/1990 | Moore | 264/101 |
| 4,929,409 A | 5/1990 | Agren et al. | 264/508 |

| | | | |
|---|---|---|---|
| 4,935,182 A | 6/1990 | Ehner et al. ............... 264/112 |
| 4,948,655 A | 8/1990 | Danese ...................... 428/213 |
| 4,956,234 A | 9/1990 | Morales .................... 428/36.5 |
| 4,960,548 A | 10/1990 | Ikeda et al. ............... 264/40.4 |
| 4,968,463 A | 11/1990 | Levasseur .................. 264/40.1 |
| 4,973,440 A | 11/1990 | Tamura et al. .............. 264/114 |
| 4,978,489 A | 12/1990 | Radvan et al. ............. 264/118 |
| 4,978,575 A | 12/1990 | Ziess ......................... 428/402 |
| 4,988,478 A | 1/1991 | Held .......................... 264/518 |
| 5,002,713 A | 3/1991 | Palardy et al. ............. 264/109 |
| 5,008,310 A | 4/1991 | Beshay ........................ 524/13 |
| 5,009,586 A | 4/1991 | Pallmann .................... 425/311 |
| 5,021,490 A | 6/1991 | Vyvoda et al. ............. 524/140 |
| 5,049,334 A | 9/1991 | Bach .......................... 264/122 |
| 5,057,167 A | 10/1991 | Gersbeck .................. 156/62.2 |
| 5,064,592 A | 11/1991 | Ueda et al. ................. 264/112 |
| 5,075,057 A | 12/1991 | Hoedl ........................ 264/115 |
| 5,075,359 A | 12/1991 | Castanga et al. ............ 524/13 |
| 5,078,937 A | 1/1992 | Eela .......................... 264/109 |
| 5,082,605 A | 1/1992 | Brooks et al. ............. 264/40.6 |
| 5,087,400 A | 2/1992 | Theuveny ................... 264/115 |
| 5,087,669 A | 2/1992 | Prejean ....................... 525/239 |
| 5,088,910 A | 2/1992 | Goforth et al. ............. 425/142 |
| 5,093,058 A | 3/1992 | Harmon et al. ............. 264/115 |
| 5,096,046 A | 3/1992 | Goforth et al. ............. 198/604 |
| 5,096,406 A | 3/1992 | Brooks et al. .............. 425/502 |
| 5,102,922 A * | 4/1992 | Kimura et al. .............. 521/145 |
| 5,120,776 A | 6/1992 | Raj et al. ..................... 524/13 |
| 5,153,241 A | 10/1992 | Beshay .......................... 524/8 |
| 5,164,267 A | 11/1992 | D'Heur et al. ........... 428/474.4 |
| 5,194,461 A | 3/1993 | Bergquist et al. ............. 524/13 |
| 5,224,318 A | 7/1993 | Kemerer ....................... 52/521 |
| 5,245,141 A | 9/1993 | Fortez et al. ................ 181/288 |
| 5,271,699 A | 12/1993 | Barré et al. ................... 409/132 |
| 5,272,000 A | 12/1993 | Chenoweth et al. ........ 428/283 |
| 5,276,082 A | 1/1994 | Forry et al. .................. 524/504 |
| 5,288,772 A | 2/1994 | Hon ............................. 524/35 |
| 5,300,533 A | 4/1994 | Dahl et al. .................... 521/76 |
| 5,302,634 A | 4/1994 | Mushovic .................... 523/219 |
| 5,332,602 A | 7/1994 | Barré et al. .................... 428/99 |
| 5,334,622 A | 8/1994 | Bergvist ....................... 521/74 |
| 5,346,954 A | 9/1994 | Wu et al. ...................... 525/85 |
| 5,363,611 A | 11/1994 | Richardson et al. ........ 312/116 |
| 5,369,147 A | 11/1994 | Mushovic .................... 523/219 |
| 5,391,585 A | 2/1995 | Grohman ..................... 521/139 |
| 5,406,768 A | 4/1995 | Giuseppe et al. ........... 52/730.4 |
| 5,422,399 A | 6/1995 | Cozens et al. ................. 252/239 |
| 5,439,749 A | 8/1995 | Klasell et al. ............... 428/537 |
| 5,441,801 A | 8/1995 | Deaner et al. ............... 428/326 |
| 5,441,816 A | 8/1995 | Grohman .................... 428/520 |
| 5,461,839 A | 10/1995 | Beck ............................ 52/519 |
| 5,474,722 A | 12/1995 | Woodhams ................. 264/45.3 |
| 5,480,602 A | 1/1996 | Nagaich ....................... 264/122 |
| 5,486,553 A | 1/1996 | Deaner et al. ................. 524/13 |
| 5,497,594 A | 3/1996 | Giuseppe et al. ........... 52/730.4 |
| 5,506,031 A | 4/1996 | Spain et al. ................. 428/172 |
| 5,508,103 A | 4/1996 | Cope ........................ 428/318.8 |
| 5,516,472 A | 5/1996 | Laver .......................... 264/118 |
| 5,518,677 A | 5/1996 | Deaner et al. ............... 264/142 |
| 5,532,065 A | 7/1996 | Gübitz et al. ............... 428/480 |
| 5,539,027 A | 7/1996 | Deaner et al. ................. 524/13 |
| 5,565,056 A | 10/1996 | Lause et al. ................. 156/243 |
| 5,576,374 A | 11/1996 | Betso et al. ................. 524/451 |
| 5,585,155 A | 12/1996 | Heikkila et al. ........... 428/36.7 |
| 5,593,625 A | 1/1997 | Riebel et al. ................ 264/115 |
| 5,635,125 A | 6/1997 | Ternes et al. .......... 264/328.18 |
| 5,654,091 A | 8/1997 | Kiriazis et al. .............. 428/332 |
| 5,695,874 A | 12/1997 | Deaner et al. |
| 5,773,138 A | 6/1998 | Seethamraju et al. |
| 5,827,607 A | 10/1998 | Deaner et al. |
| 5,847,016 A | 12/1998 | Cope .......................... 52/84.1 |
| 5,866,264 A | 2/1999 | Zehner et al. ............... 428/481 |
| 5,876,641 A | 3/1999 | Leclair et al. |
| 5,882,564 A | 3/1999 | Puppin |
| 5,932,334 A | 8/1999 | Deaner et al. |
| 5,948,505 A | 9/1999 | Puppin |
| 5,948,524 A | 9/1999 | Seethamraju et al. |
| 5,981,067 A | 11/1999 | Seethamraju et al. |
| 5,985,429 A | 11/1999 | Plummer et al. |
| 5,997,784 A | 12/1999 | Karnoski ...................... 264/54 |
| 6,004,668 A | 12/1999 | Deaner et al. |
| 6,007,656 A | 12/1999 | Heikkila et al. |
| 6,015,611 A | 1/2000 | Deaner et al. |
| 6,015,612 A | 1/2000 | Deaner et al. |
| 6,054,207 A | 4/2000 | Finley ..................... 428/317.9 |
| 6,210,792 B1 | 4/2001 | Seethamraju et al. |

OTHER PUBLICATIONS

John R. Patterson and James L Souder, "A More Efficient Processing Aid for Foamed Vinyl," a reprint from *Resin Review*, vol. XLV, No. 1, pp. 1–8, (no date).

"Rigid Vinyl Foam Applications", Rohm and Haas (no date).

"SAFOAM® AP–40 Chemical Nucleating and Blowing Agent", Reedy International Corporation, Specification Sheet (no date).

"Measuring Performance Improvements with SAFOAM® in Foam Extrusion Applications", Reedy International Corporation (no date).

"Celogen Foaming Agents, CELOGEN® AZRV" Product Information from Uniroyal Chemical (no date).

GMA–HEFT 11, vom 14.3.1974, German Abstracts.

Polymer Engineering and Science, Matuana et al., "Processing and Cell Morphology Relationships for Microcellular Foamed PVC/Wood Fiber Composites", vol. 37, No. 7, Jul. 1997, pp. 1137–1147.

1994/95 Basics of Design Engineering, *Machine Design*; pp. 621–622, Jun. 1994.

* cited by examiner

FOAMED POLYMER-FIBER COMPOSITE

FIELD OF THE INVENTION

This invention relates to polymer-fiber composites used for the fabrication of decking, railing, siding and structural materials, and more particularly, to foamed composites which are lightweight and provide adequate strength and mechanical properties for building requirements.

BACKGROUND OF THE INVENTION

Synthetic lumber has been used as a substitute for wood in areas where wood can deteriorate quickly due to environmental conditions. Although in the past, its commercialization was limited by costs, modern recycling techniques and low cost extrusion manufacturing capability have permitted greater penetration by polymer-fiber composite materials into the commercial and residential markets. One such product manufactured under the trademark TREX, by Trex Company, LLC, Winchester, Va., consists of a polyethylene-wood fiber blend which is extruded into board dimensions for decking applications. Polyethylene-wood composite boards in 5/4 inch thicknesses have sufficient rigidity to be used as decking planks, but typically are not recommended for structural wood substitutes, such as the lattice structure often used as a support for decks.

Polyethylene composites are attractive because they permit screw fasteners to "countersink", such that the heads of the screws bury or at least become flush with the board surface, without predrilling. These synthetic wood products are weather resistant and relatively maintenance free. Once installed, they resist splintering and warping normally associated with wood boards. They are also characterized by "color weatherability"; for example, the TREX product initially is a light coffee brown color and converts to a weathered gray appearance when exposed to rain water and sunlight.

Polyethylene-wood composite boards do not require painting, and never include knots which often result in damage to the surface of ordinary wood lumber, and usually more difficult hammering or screwing of fasteners. These composite materials also do not shed sap, and have a smooth surface texture that is comfortable for even barefoot walking.

In addition to polyethylene, other plastics have been suggested for use in the manufacture of synthetic wood products. Polyvinyl-chloride ("PVC") thermoplastics have been used in combination with wood fibers to make extruded materials, for use in windows and doors, for example. See U.S. Pat. No. 5,486,553 assigned to Andersen Corporation. Such components are designed to substitute for structural wooden members and typically have a tensile or Young's modulus of about 500,000 psi or greater. Because they are often load bearing, some of these wood fiber-PVC reinforced articles are dense, relatively heavy, and are believed to require predrilling in order to countersink a screw head.

Accordingly, there remains a need for a building material that is light weight, and can permit the countersinking of a screw head without predrilling. There also remains a need for an extrudable polymer-fiber composite that can be tinted in a variety of permanent or semi-permanent colors or to provide a weathered look.

SUMMARY OF THE INVENTION

This invention provides foamed polymer-fiber composite building materials which may include about 35–75 wt. % of the polymeric resin, about 25–65 wt. % fiber, and a specific gravity of less than about 1.25 g/cc. The resulting composite includes a plurality of pores or cells therein resulting from the addition of a blowing agent or disbursed gas into a molten precursor of the composite.

The composites of this invention are nearly 10% lighter than non-foamed synthetic boards of similar composition. The preferred vinyl-resin boards are stiffer than polyethylene wood composites of similar thickness. PVC can be foamed through the addition of a blowing agent to a compounded mixture of resin and wood flour. This results in a preferred amount of porosity of at least about a 1% by volume of solids, concentrated primarily in a central region of the cross-section of extruded composite forms made from these mixtures. The tensile and flexural modulus of the preferred board-like members of this invention is less that about 500,000 psi, and generally about 100,000 to 450,000 psi. The resulting board-like surfaces permit the countersinking of screw heads without predrilling.

The polymer-fiber composites of this invention can also include additives for improving the melt strength of a molten precursor of the composite during extrusion operations. The preferred additives for this purpose include acrylic modifiers in amounts ranging from 0.1 to about 15 weight percent. Building materials made from such composites can be tinted to provide a weathered look through the addition of dyes, such as mixed metal oxides and titanium dioxide, pigments, or flyash, for example. In order to reduce costs, larger wood flour particles greater than 30 mesh size can be used.

DETAIL DESCRIPTION OF THE INVENTION

The foamed polymer-fiber composites of this invention can be used by themselves, or in conjunction with "capstock" or coextrusions of other materials, such as, for example, pure or copolymer resins, resins filled with wood or glass fiber, or additives, such as sand, to provide better traction, strength, ultraviolet protection or textures to provide a more wood-like appearance. This invention also pertains to a process for making foamed polymer-fiber composites, such as building materials, including roof shingles, siding, floor tiles, paneling, moldings, structural components, steps, door and window sills and sashes; house and garden items, such as planters, flower pots, landscape tiles, decking, outdoor furniture, fencing, and playground equipment; farm and ranch items, including pasture fencing, posts and barn components; and marine items, for example, decking, bulkheads and pilings.

Figure 1:
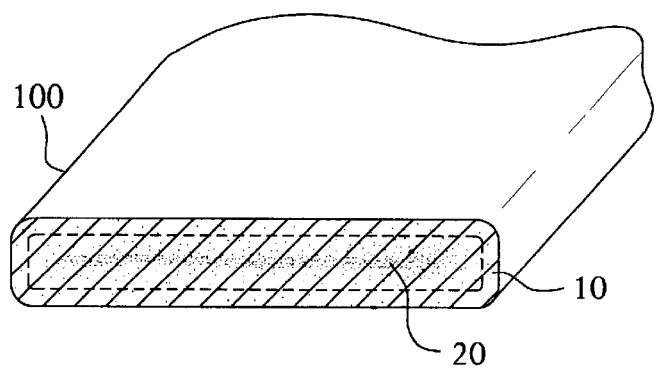
FIG. 1: is a partial, cross-sectional, front perspective view of a preferred foamed polymer-fiber composite building material of this invention.

As shown in the figures, and in particular, FIG. 1, there is shown a preferred foamed polymer-fiber composite 100 which includes about 35–75% of a polymeric resin, about 25–65% fiber with a specific gravity of less than about 1.25 g/cc, and preferably about 0.5–1.2 g/cc. This composite 100 includes a plurality of pores or cells defining porosity 20 therein resulting from the addition of a blowing agent or gas to a molten precursor of said composite 100. The porosity desirably measures at least about 1%, and preferably about 5–40% by volume of solids in the composite 100. The composites of this invention also may include one or more additives, such as a process aid, pigment, or plasticizer.

Figure 2:
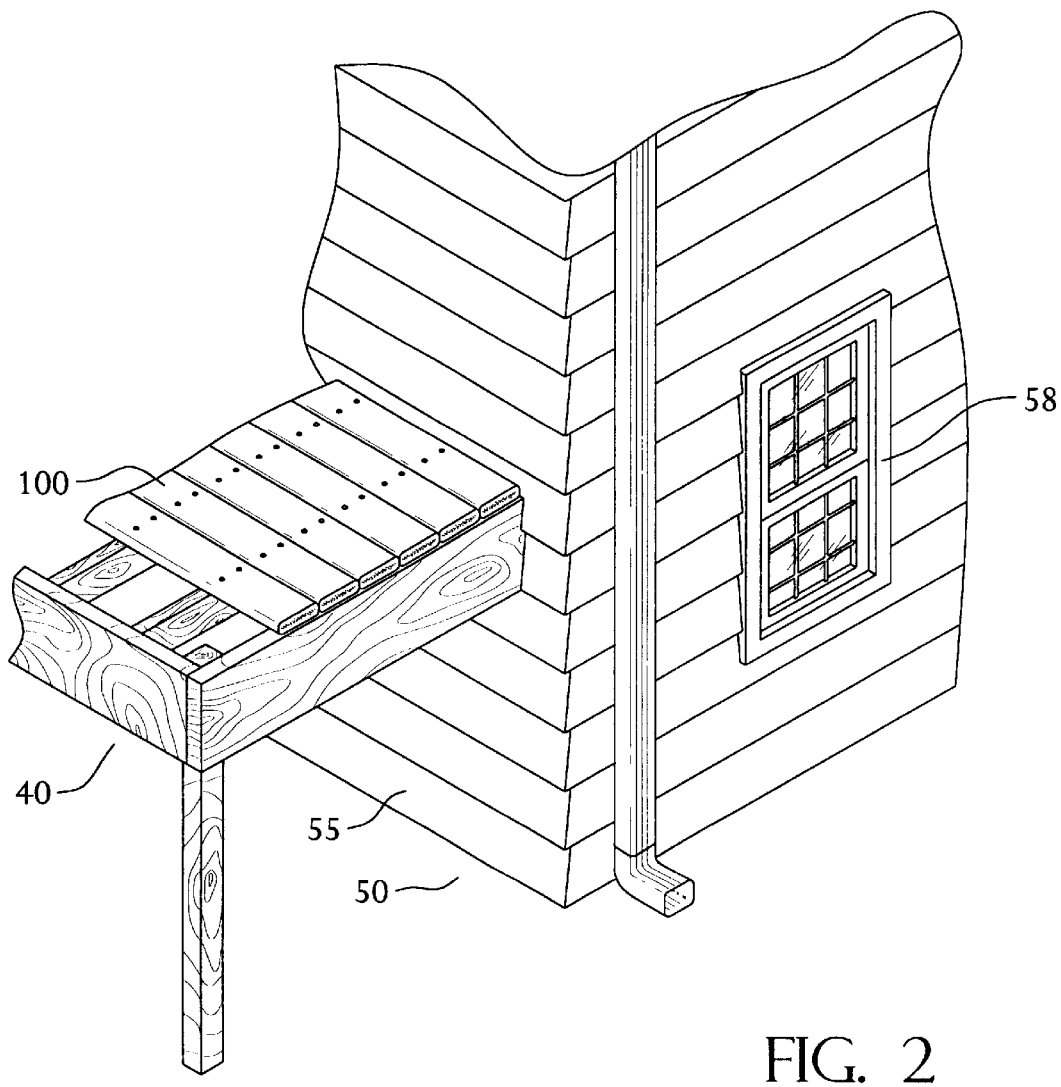
FIG. 2: is a front perspective, partial view, of a deck construction and home using the preferred composite building materials of this invention.
Figure 3:
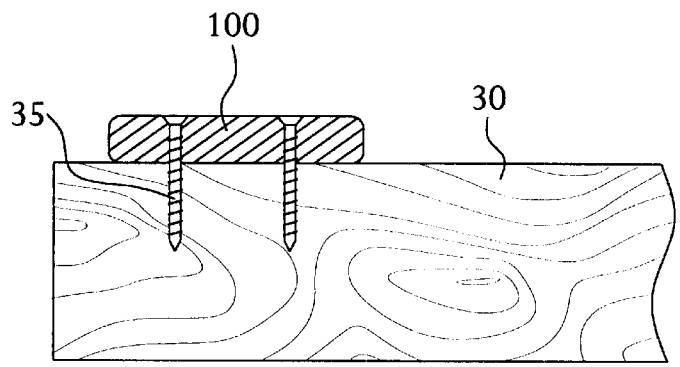
FIG. 3: is a side, cross-sectional view of the composite building material of FIG. 1 illustrating a screw which has been inserted in a counter-sink relationship with a top surface of the building material.
Figure 4:
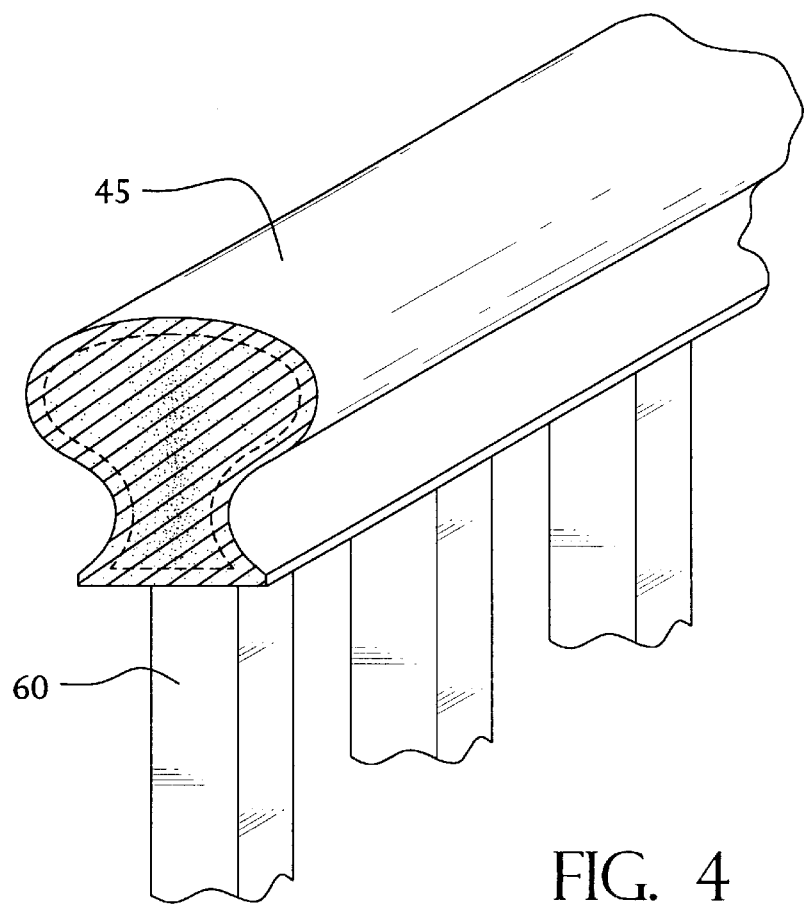
FIG. 4: is a partial, cross-sectional, front perspective view of a preferred railing of this invention.
Figures 5, 6, 7:
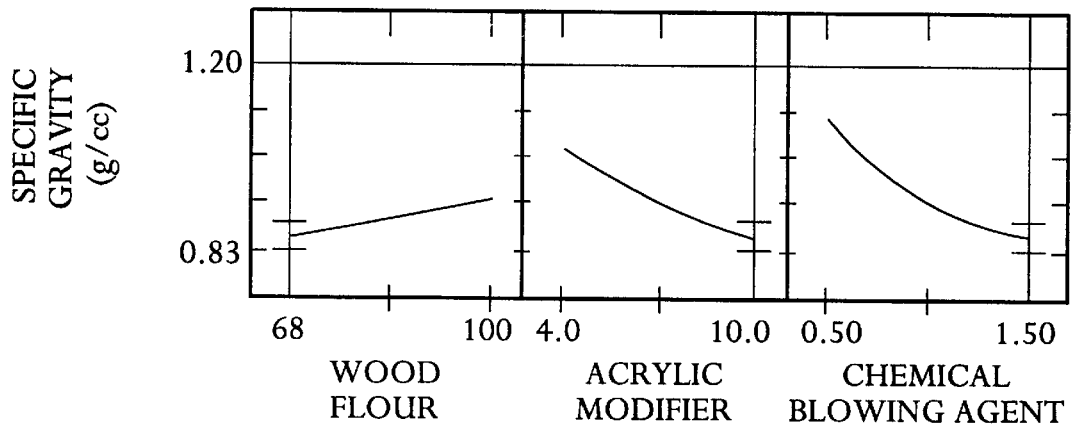
FIG. 5: is a graph depicting specific gravity versus wood flour concentration for the composites of this invention.
FIG. 6: is a graph depicting specific gravity versus acrylic modifier concentration for the composites of this invention.
FIG. 7: is a graph depicting specific gravity versus chemical blowing agent concentration for the composites of this invention.
Figures 8, 9, 10:
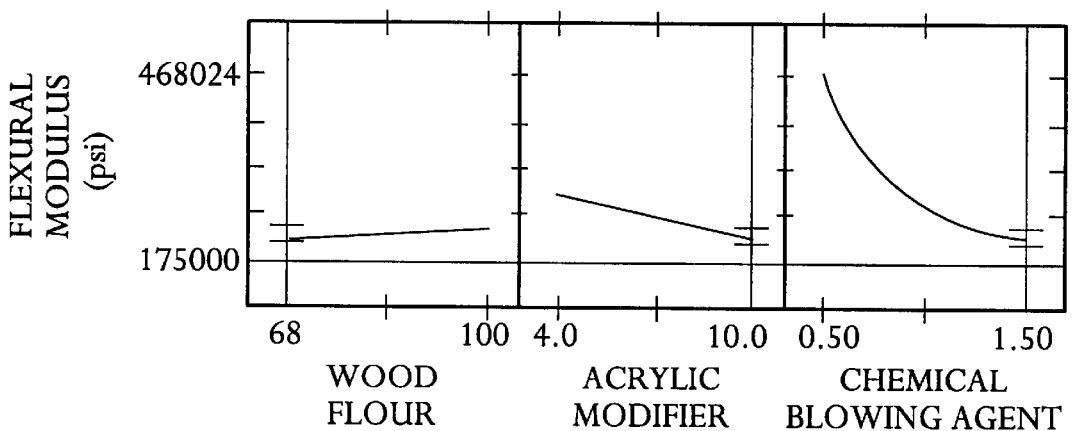
FIG. 8: is a graph depicting flexural modulus versus wood flour concentration for the composites of this invention.
FIG. 9: is a graph depicting flexural modulus versus acrylic modifier concentration for the composites of the invention.
FIG. 10: is a graph depicting flexural modulus versus chemical blowing agent concentration for the composites of this invention.
Figures 11, 12, 13:
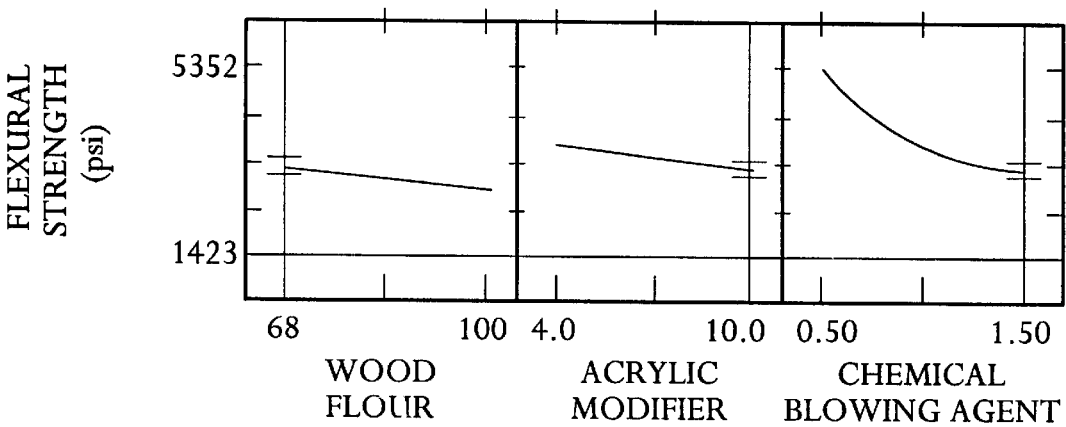
FIG. 11: is a graph depicting flexural strength versus wood flour concentration for the composites of this invention.
FIG. 12: is a graph depicting flexural strength versus acrylic modifier concentration for the composites of this invention.
FIG. 13: is a graph depicting flexural strength versus chemical blowing agent concentration for the composites of the invention.

As shown in FIGS. 2–4, the foamed polymer-fiber composite 100 of this invention is ideally suited for decking, siding, railings, window frames, including styles and rails, and balusters. Even though the composite 100 is lightweight, it generally has a flexural modulus, tensile modulus, and/or Young's modulus of about 100,000 to 450,000 psi. As shown in FIG. 3, the composite 100 preferably allows screw and nail fasteners, such as screw 35, to be secured in a countersink relationship with the surface of the composite 100 or below the surface, without predrilling. This is generally accomplished by the use of plasticizing agents to lower the compression strength of the composite 100, and/or by the careful use of blowing agents or gas in the molten precursor of the composite 100, so as to provide a cellular internal structure containing porosity 20 surrounded by a polymeric skin 10. This porosity, even without plasticizing agents, provides enough compressive strength relief to permit screw fasteners to countersink without predrilling. This permits a very attractive deck 40 of side-by-side composite boards as shown in FIG. 2. Ideally, for strength and cost considerations, the support structure and columns of the deck are made from wood.

Also as shown in FIG. 2, the preferred composite 100 can be fashioned, for example, by extrusion, in the shape of siding 55 or window frame components 58, such as styles or rails, for a house 50. As shown in FIG. 4, the composite 100 can also be shaped into a railing 45 or baluster 60.

The preferred materials of this invention will now be described in more detail. The composites generally contain about 35–75 wt. % resinous materials, such as thermoplastic and thermosetting resins, for example, PVC, polyethylene, polypropylene, nylon, polyesters, polysulfones, polyphenylene oxide and sulphide, epoxies, cellulosics, etc. A preferred thermoplastic material for the panels of this invention is PVC. PVC thermoplastics comprise the largest volume of thermoplastic polymers in commercial use. Vinyl chloride monomer is made from a variety of different processes involving the reaction of acetylene and hydrogen chloride and the direct chlorination of ethylene. Polyvinyl chloride is typically manufactured by the free radical polymerization of vinyl chloride. After polymerization, polyvinyl chloride is commonly combined with impact modifiers, thermal stabilizers, lubricants, plasticizers, organic and inorganic pigments, fillers, biocides, processing aids, flame retardants or other commonly available additive materials, when needed. Polyvinyl chloride can also be combined with other vinyl monomers in the manufacture of polyvinyl chloride copolymers. Such copolymers can be linear copolymers, graft copolymers, random copolymers, regular repeating copolymers, block copolymers, etc. Monomers that can be combined with vinyl chloride to form vinyl chloride copolymers include acrylonitrile; alpha-olefins such as ethylene, propylene, etc.; chlorinated monomers such as vinylidene, dichloride; acrylate monomers such as acrylic acid, methylacrylate, methyl-methacrylate, acrylamide, hydroxethyl acrylate, and others; styrenic monomers such as styrene, alpha methyl styrene, vinyl toluene, etc.; vinyl acetate; or other commonly available ethylenically unsaturated monomer compositions. Such monomers can be used in an amount of up to about 50 mol-%, the balance being vinyl chloride. PVCs can be compounded to be flexible or rigid, tough or strong, to have high or low density, or to have any of a wide spectrum of physical properties or processing characteristics. PVC resins can also be alloyed with other polymers, such as ABS, acrylic, polyurethane, and nitrile rubber to improve impact resistance, tear strength, resilience, or proccessability. They can be produced waterwhite in either rigid or flexible compositions, or they can be pigmented to almost any color.

In the preferred embodiments of this invention, rigid PVC, optionally containing a small amount of plasticizer, is employed. This material is a hard and tough and can be compounded to have a wide range of properties, including impact resistance and weatherability, e.g., fading color to a wood grey appearance. It also has a tensile strength of about 6,000–7,500 psi, a percent elongation of about 40–80%, and a tensile modulus of about $3.5–6.0 \times 10^6$ psi. It can be acceptably used without chlorination, to about 140° F., and with chlorination to about 220° F. It also has a coefficient of thermal expansion of about $3–6 \times 10^{-5}$ inch/inch-° F.

The composite building materials of this invention can be injection or vacuum molded, extruded and drawn, using customary manufacturing techniques for thermoplastic and thermosetting materials. In the preferred embodiment, a mixture of PVC regrind or virgin compound is compounded and then heated and extruded through a die to produce boards and other shapes having a length of about 4–20 feet and thicknesses ranging from 0.05–6.0 inches. The extruded thermoplastic boards can be subject to further molding, calendaring, and finishing to provide a wood grain or fanciful texture.

The building material 100 of this invention also can contain about 25–60 wt. % fiber, such as glass, wood, cotton, boron, carbon, or graphite fibers. Additionally, inorganic fillers, such as calcium carbonate, talc, silica, etc. can be used. Preferably, the fibers are "cellulosic" in nature. Cellulosic fibers can be derived from recycled paper products, such as agrifibers, pulp, newsprint, soft woods, such as pine, or hard woods from deciduous trees. Hard woods are generally preferred for fiber manufacture because they absorb less moisture. While hard wood is the primary source of fiber for the invention, additional fiber make-up can be derived from a number of secondary sources including soft wood fibers, natural fibers including bamboo, rice, sugar cane, and recycled or reclaimed fiber from newspapers, cardboard boxes, computer printouts, etc. This invention can utilize wood flour of about 10–100 mesh, preferably 20–30 mesh.

Preferably, this invention combines the resin and wood flour components with a chemical blowing agent, or introduces a gaseous medium into a molten mixture of the resin and wood fiber to produce a series of trapped bubbles prior to thermo-forming the mixture, for example, by molding, extrusion or co-extrusion. Such processes for making rigid foam articles are generally well known.

In the preferred processes of this invention, a quantity of PVC regrind in small chunks is mixed with 20–30 mesh wood flour of about grass-seed size which has been pre-dried to release any trapped moisture as steam. The mixture also includes a melt enhancer, such a high molecular weight acrylic modifier, which improves melt elasticity and strength and enhances cellular structure, cell growth and distribution.

A chemical blowing agent or gas can also be added to the mixture to reduce the density and weight of the composite 100 by foaming. If a chemical blowing agent is used, it is mixed into the compound during blending or at the feed throat of the extruder. In the extruder, the blowing agent is decomposed, disbursing gas, such as nitrogen or $CO_2$, into the melt. As the melt exits the extrusion die, the gas sites experience a pressure drop expanding into small cells or bubbles trapped by the surrounding polymer.

Chemical blowing agents can be any of a variety of chemicals which release a gas upon thermal decomposition. Chemical blowing agents may also be referred to as foaming agents. The blowing agent, or agents, if more than one is used, can be selected from chemicals containing decomposable groups such as azo, N-niroso, carboxylate, carbonate, hetero-cyclic nitrogen-containing and sulfonyl hydrazide groups. Generally, they are solid materials that liberate gas when heated by means of a chemical reaction or upon decomposition. Representative compounds include azodicarbonamide, bicarbonates, dinitrosopentamethylene tetramethylene tetramine, p,p'-oxy-bis (ben-zenesulfonyl)-hydrazide, benzene-1,3-disulfonyl hydrazide, aso-bis-(isobutyronitrile), biuret and urea.

The blowing agent may be added to the polymer in several different ways which are known to those skilled in the art, for example, by adding the solid power, liquid or gaseous agents directly to the resin in the extruder while the resin is in the molten state to obtain uniform dispersion of the agent in the molten plastic. Preferably the blowing agent is added before the extrusion process and is in the form of a solid. The temperature and pressure to which the foamable composition of the invention are subjected to provide a foamed composition will vary within a wide range, depending upon the amount and type of the foaming agent, resin, and cellulosic fiber that is used. Preferred foaming agents are selected from endothermic and exothermic varieties, such as dinitrosopentamethylene tetramine, p-toluene solfonyl semicarbazide, 5-phenyltetrazole, calcium oxalate, trihydrazino-s-triazine, 5-phenyl- 3,6-dihydro-1,3,4-oxandiazin-2-one, 3,6-dihydro 5,6-diphenyl-1,3,4 oxadiazin-2-one, azodicarbonamide, sodium bicarbonate, and mixtures thereof.

In addition to the above, a coloring agent can be added to the compounded mixture, such as dyes, colored pigments, or flyash, or a mixture of these ingredients depending on the resulting color, and cost considerations. Such additives can provide "weatherability" or a faded greyish coloring or a permanent tint, such as blue, green or brown. This invention can be further understood by reference to the following examples.

EXAMPLES

Examples 1–16 were formulated and extruded into test boards. Mechanical properties of each formulation were measured and compared.

TABLE I

Parts per hundred parts resin (PHR), and
Weight per cent (WT %) vs.
Property of Selected Formulations

| | PHR | | | | WT % | | | | PROPERTY | | |
|---|---|---|---|---|---|---|---|---|---|---|---|
| FORMU-LATION | RIGID PVC CMPD | WOOD FLOUR | ACRYLIC MODIFIER | BLOWING AGENT | RIGID PVC CMPD | WOOD FLOUR | ACRYLIC MODIFIER | BLOWING AGENT | SPECIFIC GRAVITY (g/cc) | FLEX MODULUS (psi) | FLEX STRENGTH (psi) |
| 1 | 100 | 68 | 4 | 0.5 | 57.97 | 39.42 | 2.32 | 0.29 | 1.16 | 421037 | 4823 |
| 2 | 100 | 100 | 10 | 0.5 | 47.51 | 47.51 | 4.75 | 0.24 | 1.07 | 398042 | 4286 |
| 3 | 100 | 100 | 4 | 1.5 | 48.66 | 48.66 | 1.95 | 0.73 | 1.09 | 297233 | 3397 |
| 4 | 100 | 68 | 10 | 1.5 | 55.71 | 37.88 | 5.57 | 0.84 | 0.83 | 205162 | 3158 |
| 5 | 100 | 100 | 4 | 0.5 | 48.90 | 48.90 | 1.96 | 0.24 | 1.17 | 357212 | 3790 |
| 6 | 100 | 68 | 10 | 0.5 | 56.02 | 38.10 | 5.60 | 0.28 | 1.09 | 457829 | 5353 |
| 7 | 100 | 68 | 4 | 1.5 | 57.64 | 39.19 | 2.31 | 0.86 | 1.06 | 287530 | 3964 |
| 8 | 100 | 84 | 7 | 0.5 | 52.22 | 43.86 | 3.66 | 0.26 | 1.11 | 431283 | 4769 |
| 9 | 100 | 84 | 4 | 1 | 52.91 | 44.44 | 2.12 | 0.53 | 1.02 | 260310 | 3386 |
| 10 | 100 | 68 | 7 | 1 | 52.08 | 43.75 | 3.65 | 0.52 | 0.98 | 270421 | 3597 |
| 11 | 100 | 100 | 10 | 1.5 | 47.28 | 47.28 | 4.73 | 0.71 | 0.94 | 224739 | 3058 |
| 12 | 100 | 100 | 10 | 1 | 47.39 | 47.39 | 4.74 | 0.47 | 0.99 | 256923 | 3207 |
| 13 | 100 | 84 | 10 | 1.5 | 51.15 | 42.97 | 5.12 | 0.77 | 0.89 | 227991 | 3124 |
| 14 | 100 | 100 | 7 | 1.5 | 47.96 | 47.96 | 3.36 | 0.72 | 0.97 | 271955 | 2996 |
| 15 | 100 | 68 | 10 | 1 | 55.87 | 37.99 | 5.59 | 0.56 | 0.93 | 305704 | 4014 |
| 16 | 100 | 84 | 10 | 05 | 51.41 | 43.19 | 5.14 | 0.26 | 1.08 | 430736 | 4747 |

In comparing the properties, it was noted that to obtain a target flexural modulus of about 200,000 psi, the following preferred formula was used.

TABLE II

PREFERRED FORMULA

|  | PPH PVC COMPOUND |
| --- | --- |
| Rigid PVC Compound | 100 |
| 20–30 Mesh Hardwood Flour | 68 |
| Acrylic Modifier | 10.0 |
| Chemical Blowing Agent | 1.5 |
| Carbon Black | .18 |

This formulation provided the most optimum combination of cost efficiency and mechanical properties.

From the foregoing, it can be realized that this invention provides improved foamed polymer wood composite materials which provide lower specific gravity and high flexural modulus while permitting countersinking of screw fasteners. They also have great durability and strength. Although various embodiments have been illustrated, this is for the purpose of describing, but not limiting the invention. Various modifications will become apparent to one skilled in the art, and are within the scope of this invention described in the attached claims.

We claim:

1. A foamed polymer composite building material, comprising about 35–73 wt. % polyvinyl chloride (PVC) resin; about 27–65 wt. % fiber, and a specific gravity of about 1.07 g/cc or less, said composite building material including at least 1% porosity by volume of solids and being formed from a molten precursor comprising from about 1.0 parts to about 1.5 parts of a gaseous medium or blowing agent per hundred parts of PVC resin; wherein said building material is capable of having a screw fastener countersunk therein without predrilling.

2. The composite building material of claim 1 further comprising an additive for improving the melt strength of said molten precursor.

3. The composite building material of claim 2 wherein said additive comprises an acrylic modifier.

4. The composite building material of claim 1 wherein said fiber comprises cellulosic fiber.

5. The composite building material of claim 1 wherein said molten precursor comprises from about 4 parts to about 10 parts of an acrylic modifier per hundred parts of PVC compound and said blowing agent is a chemical blowing agent.

6. The composite building material of claim 5 further comprising about 5–40% porosity by volume of solids.

7. The composite building material of claim 6 wherein said building material has a specific gravity of about 0.5–1.07 g/cc.

8. The composite building material of claim 1, further comprising an additive for producing a weathered appearance to said building material, said additive selected from the group consisting of dyes, pigments, flyash and mixtures thereof.

9. The composite building material of claim 1 including a flexural modulus of about 100,000 to 450,000 psi.

10. The composite building material of claim 1 wherein the amount of blowing agent is about 1.5 parts blowing agent per hundred parts PVC compound.

11. The composite building material of claim 1, having a porosity of about 5–40% by volume based on the volume of solids in the composite.

12. The composite building material of claim 1, further comprising a plasticizer.

13. The composite building material of claim 1, wherein said fibers comprise wood flour of about 20–30 mesh.

14. The composite building material of claim 1, wherein said polymeric resin comprises PVC regrind.

15. A foamed polymer-wood composite, formed from a molten mixture comprising: about 35–73 wt. % PVC resin, about 27–65 wt. % wood fiber, and from about 1.0 parts to about 1.5 parts of a gaseous medium or blowing agent per hundred parts of PVC resin, said molten mixture forming a polymer-wood composite having a specific gravity of about 1.07 g/cc or less, and a flexural modulus of about 100,000–450,000 psi; wherein said polymer-wood composite is capable of having a screw fastener countersunk therein without predrilling.

16. The composite of claim 15 further comprising an additive for improving the melt strength of said molten mixture during extrusion.

17. The composite of claim 15 wherein said blowing agent is mixed into said polymeric resin and wood fiber during compounding, or at about the feed throat of an extruder.

18. The polymer-wood composite of claim 15, wherein said molten mixture further comprises from about 4 parts to about 10 parts of an acrylic modifier per hundred parts of PVC compound and said blowing agent is a chemical blowing agent.

19. A foamed polymer wood composite building material having a generally board-shaped cross-section, formed from a molten precursor comprising: about 45–60 wt. % of a polyvinyl-chloride resin, about 27–65 wt. % wood flour, about 0.1–15 wt. % acrylic modifier; and about 1.0 parts to about 1.5 parts of a chemical blowing agent per hundred parts of polyvinyl chloride resin; said building material having a specific gravity of about 1.07 g/cc or less and being capable of having a screw fastener countersunk therein without predrilling; said building material also comprising a flexural modulus of about 100,000–450,000 psi.

20. The composite building material of claim 19 wherein said polyvinyl-chloride resin comprises a compounded resinous mixture.

21. The composite building material of claim 19 wherein said building material comprises a pigment for producing a weathered wood-gray appearance.

* * * * *